United States Patent
Li et al.

(10) Patent No.: US 12,541,397 B2
(45) Date of Patent: Feb. 3, 2026

(54) UNIFORM THREAD MANAGEMENT BASED ON UTILIZING MODULE TEMPLATES WITH LIBRARIES ACCORDENG TO STORAGE AREA TEMPLATE

(71) Applicant: International Business Machines Corporation, Armonk, NY (US)

(72) Inventors: Naijie Li, Beijing (CN); Bao Zhang, Beijing (CN); Ming Ran Liu, Beijing (CN); Yuan Zhai, Beijing (CN); Jia Yu, Beijing (CN); Peng Hui Jiang, Beijing (CN); Guang Han Sui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 17/651,943

(22) Filed: Feb. 22, 2022

(65) Prior Publication Data

US 2023/0267005 A1 Aug. 24, 2023

(51) Int. Cl.
*G06F 9/50* (2006.01)
*G06F 9/455* (2018.01)
*G06F 9/48* (2006.01)

(52) U.S. Cl.
CPC ........ *G06F 9/5022* (2013.01); *G06F 9/45504* (2013.01); *G06F 9/4881* (2013.01); *G06F 9/5055* (2013.01)

(58) Field of Classification Search
None
See application file for complete search history.

(56) References Cited

U.S. PATENT DOCUMENTS

| | | | | |
|---|---|---|---|---|
| 5,136,687 A | * | 8/1992 | Edelman | G06V 10/764 706/15 |
| 6,463,480 B2 | * | 10/2002 | Kikuchi | G06F 9/4843 719/315 |

(Continued)

FOREIGN PATENT DOCUMENTS

| | | |
|---|---|---|
| CN | 113296962 A | 8/2021 |
| WO | 2018134046 A1 | 7/2018 |

OTHER PUBLICATIONS

Mell et al., "The NIST Definition of Cloud Computing", NIST National Institute of Standards and Technology U.S. Department of Commerce, Special Publication 800-145, Sep. 2011, 7 pages.

(Continued)

*Primary Examiner* — Aimee Li
*Assistant Examiner* — Zujia Xu
(74) *Attorney, Agent, or Firm* — Stephen R. Yoder

(57) ABSTRACT

A thread management process where a storage area template is generated for a plurality of threads that are to be created by a process in a computing system, the storage area template comprising at least one module template for at least one library that is to be loaded by the process. In the computing system, a plurality of storage areas is allocated for the plurality of threads based on the storage area template, respectively. The plurality of threads are managed based on the plurality of storage areas, respectively. All threads and libraries may be managed in a uniform way according to the storage area template. Therefore, thread management may be simplified and then may lead to reduced costs in the storage and time resources.

17 Claims, 8 Drawing Sheets

(56) References Cited

U.S. PATENT DOCUMENTS

| | | | |
|---|---|---|---|
| 6,577,982 B1* | 6/2003 | Erb | G06F 11/3684 |
| | | | 702/120 |
| 9,183,013 B2 | 11/2015 | Lagergren | |
| 10,776,256 B2 | 9/2020 | Yoshimura | |
| 2004/0133893 A1* | 7/2004 | Carbone | G06F 9/4843 |
| | | | 718/107 |
| 2004/0194098 A1* | 9/2004 | Chung | G06F 9/5016 |
| | | | 718/100 |
| 2006/0080682 A1* | 4/2006 | Anwar | G06F 9/44521 |
| | | | 719/331 |
| 2007/0288913 A1* | 12/2007 | Chou | G06F 8/54 |
| | | | 717/163 |
| 2008/0034015 A1* | 2/2008 | Behnen | G06F 16/254 |
| 2011/0179430 A1* | 7/2011 | Kim | G06F 9/44521 |
| | | | 719/331 |
| 2013/0111034 A1* | 5/2013 | Upadhya | G06F 3/0605 |
| | | | 709/226 |
| 2016/0026791 A1* | 1/2016 | Melski | G06F 21/54 |
| | | | 726/25 |
| 2016/0275019 A1* | 9/2016 | Nam | G06F 12/1408 |
| 2019/0087316 A1 | 3/2019 | Ostrovsky | |
| 2020/0117372 A1* | 4/2020 | Corey | G06F 9/5083 |

OTHER PUBLICATIONS

Michael et al., "Hazard Pointers Safe Resource Reclamation for Optimistic Concurrency", Document No. P0233RO, Date: Feb. 12, 2016, 25 pages.

* cited by examiner

UNIFORM THREAD MANAGEMENT BASED ON UTILIZING MODULE TEMPLATES WITH LIBRARIES ACCORDENG TO STORAGE AREA TEMPLATE

BACKGROUND

The present invention relates to thread management, and more specifically, to methods, systems and computer program products for managing threads that are created in a process.

Nowadays, with increased complexity of applications, multi-threading technology is widely used to implement various functions in an application. Specifically, the application may be run in a computing system and a plurality of threads may be created in a process of the application. Local storage spaces should be allocated to each thread for managing respective variables called by each thread. Usually, the plurality of threads may reach a great number, which in turn leads to significant costs in storage resources as well as time resources in the computing system. At this point, how to manage the plurality of threads in an easy and effective way becomes a hot focus.

SUMMARY

In an aspect of the present invention, there is provided a computer-implemented method that may be implemented by one or more processors in a computer system. In the method, one or more processors generate a storage area template for a plurality of threads that are to be created by a process in a computing system, the storage area template comprising at least one module template for at least one library that is to be loaded by the process. One or more processors allocate, in the computing system, a plurality of storage areas for the plurality of threads based on the storage area template, respectively. One or more processors manage the plurality of threads based on the plurality of storage areas, respectively. With these embodiments, all threads and libraries may be managed in a uniform way according to the storage area template. Therefore, the thread management may be simplified and then may lead to reduced costs in the storage and time resources.

In another aspect of the present invention, a method, a computer program product, and a system includes: generating a storage area template for a plurality of threads that are to be created by a process in a computing system, the storage area template including a module template for a library that is to be loaded by the process, the library defining a set of variables; allocating, in the computing system, a plurality of storage areas for the plurality of threads respectively, based on the storage area template; and managing the plurality of threads based on the respective plurality of storage areas.

DETAILED DESCRIPTION

Figure 1:
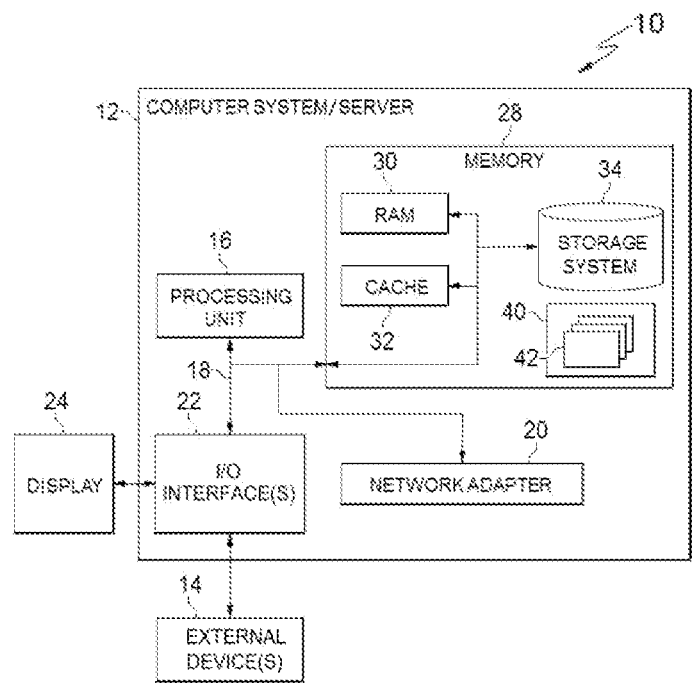
FIG. 1 depicts a cloud computing node according to embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computer system environments or configurations. Examples of well-known computer systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
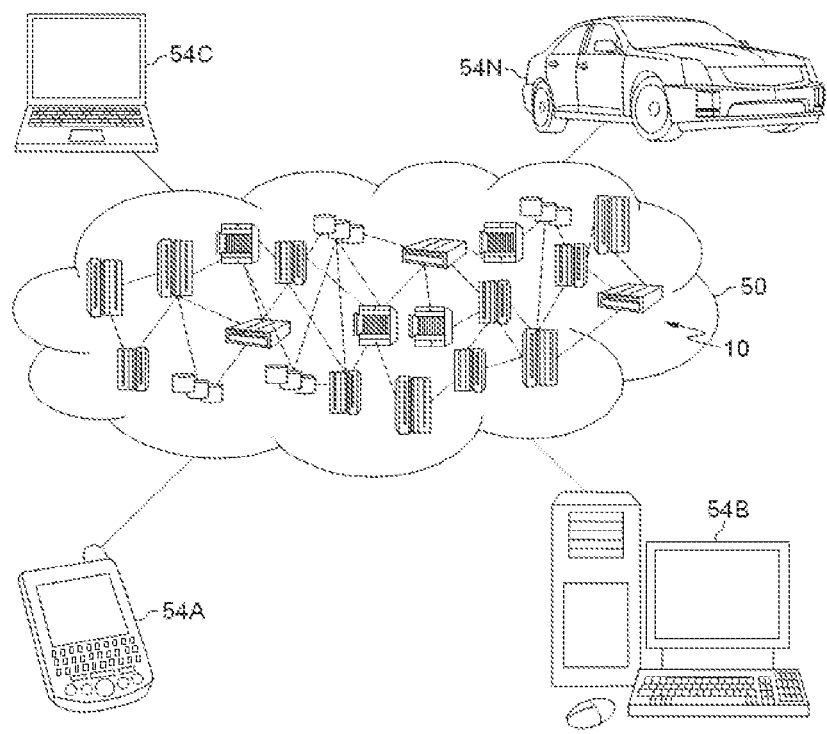
FIG. 2 depicts a cloud computing environment according to embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
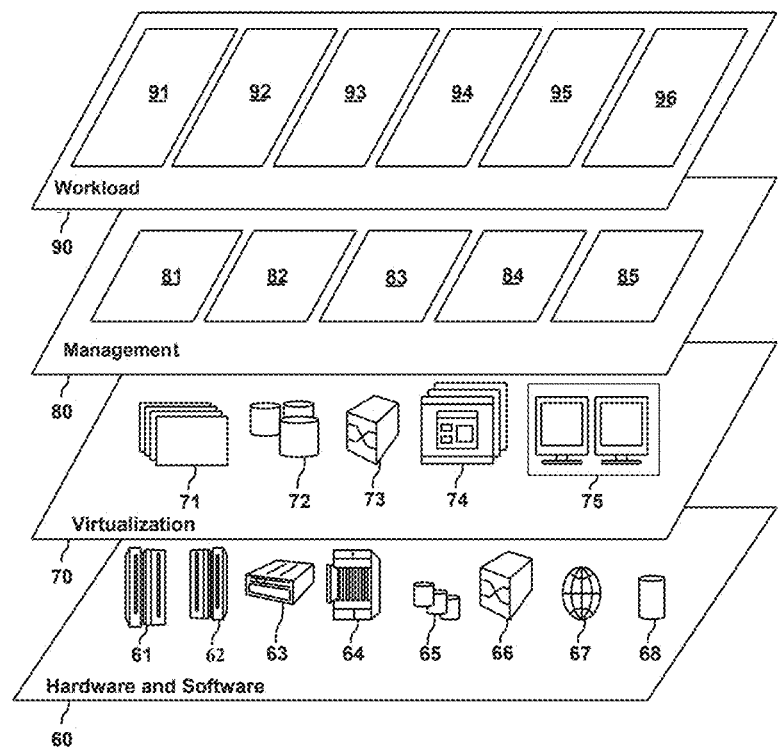
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68, and thread management according to embodiments of the present invention.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and other functions 96.

Figure 4:
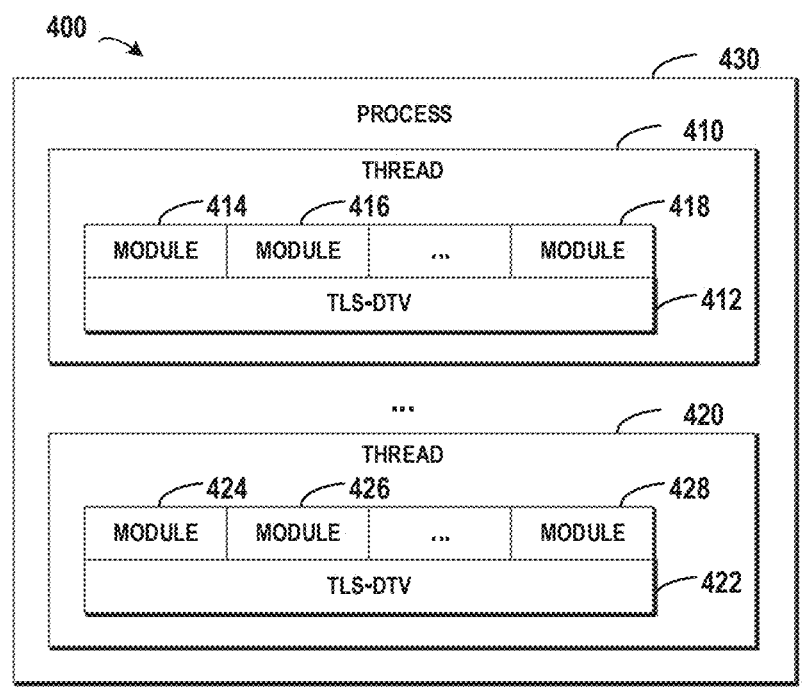
FIG. 4 depicts an example environment for thread management to which embodiments of the present invention may be implemented.

It should be noted that the thread management according to embodiments of the present invention could be implemented by computer system/server 12 of FIG. 1. Reference will be made to FIG. 4 for a brief description of a working environment of the invention. FIG. 4 depicts an example environment 400 for thread management to which embodiments of the present invention may be implemented. In FIG. 4, a process 430 may be provided for implementing various functions in an application in a computing system. Here, a plurality of threads 410, . . . , and 420 may be created in the process 430. Local storage areas may be allocated to the plurality of threads 410, . . . , and 420, respectively.

Based on the thread-local storage (TLS) technology, an individual TLS-dynamic thread vector (DTV) may be allocated to each of the plurality of threads 410, . . . , and 420. For example, a TLS-DTV 412 is allocated to the thread 410, which comprises a plurality of modules 414, 416, . . . , and 418 for a plurality of libraries that are loaded by the process 430. Here, each module is allocated for a specific library. Supposing the process 430 loads n libraries, the module 414 is allocated to the $1^{st}$ library, the module 416 is allocated to the $2^{nd}$ library, . . . , and the module 418 is allocated to the $n^{th}$ library. Further, a TLS-DTV 422 is allocated to the thread 420, which comprises a plurality of modules 424, 426, . . . , and 428 for the plurality of libraries.

Usually the threads 410, . . . and 420 may load the same or different libraries, in order to simplify the thread management, the TLS-DTVs 412, . . . , and 422 have the same structure and comprise all the modules for all the libraries. Here, all the modules correspond to respective addresses and cost physical storage space in the computing system. Even if the thread 410 does not call a specific library (such as the 1$^{st}$ library), the TLS-DTV 412 for the thread 410 also has a corresponding module for the specific library (such as the module 414 for the 1$^{st}$ library). Therefore, the TLS-DTVs 412, . . . , and 422 may comprise redundant storage space that will never be accessed.

In the existing solution, various protection mechanisms are provided for managing the TLS-DTVs. For example, the mprotect( ) mechanism may change protection rules for the calling process's memory page(s). If the calling process tries to access storage areas in a manner that violates the protection, then a kernel of the computing system generates a SIGSEGV signal for the process. In the guard storage facility mechanism, a guarded storage facility sets up a boundary indicating a range of addresses to be guarded or protected. When a process attempts to access an address in a guarded section defined by the boundary, a guarded storage event occurs. Although the above protection mechanism may protect the storage areas allocated to the threads, the thread management involves complex operations and may possibly cause great waste in the storage space and time delay. Therefore, it is desired to propose an easy and effective way for the thread management.

Figure 5:
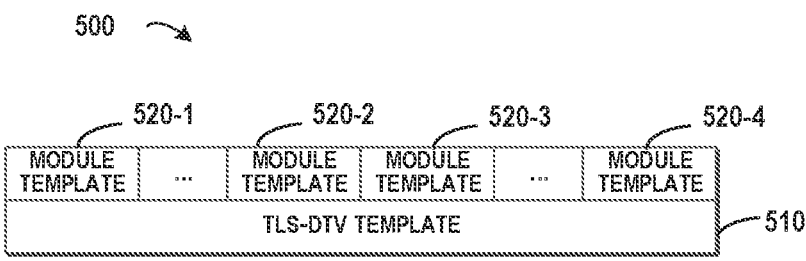
FIG. 5 depicts an example diagram of a storage area template for thread management according to embodiments of the present invention.

In view of the above drawbacks, embodiments of the present invention provide an intelligent method to manage all the threads that are created in the process in a uniform way. Reference will be made to FIG. 5 for a brief discussion of the present invention. FIG. 5 depicts an example diagram 500 of a storage area template for thread management according to embodiments of the present invention. In FIG. 5, a storage area template (such as a TLS-DTV template 510) is provided in a computing system for managing all the threads that are to be created by a process. The TLS-DTV template 510 may comprise at least one module template for at least one library that is to be loaded by the process. For example, the TLS-DTV template 510 may comprise a plurality of module templates 520-1, . . . , 520-2, 520-3, . . . , and 520-4 (collectively be referred to as the module template 520). Supposing the process calls n libraries, the module template 520-1 may be generated for the 1$^{st}$ library, . . . , and the module template 520-4 may be generated for the n$^{th}$ library. With these embodiments, all threads and libraries may be managed in a uniform way according to the storage area template. Therefore, thread management may be simplified and then may lead to reduced costs in the storage and time resources.

Figure 6:
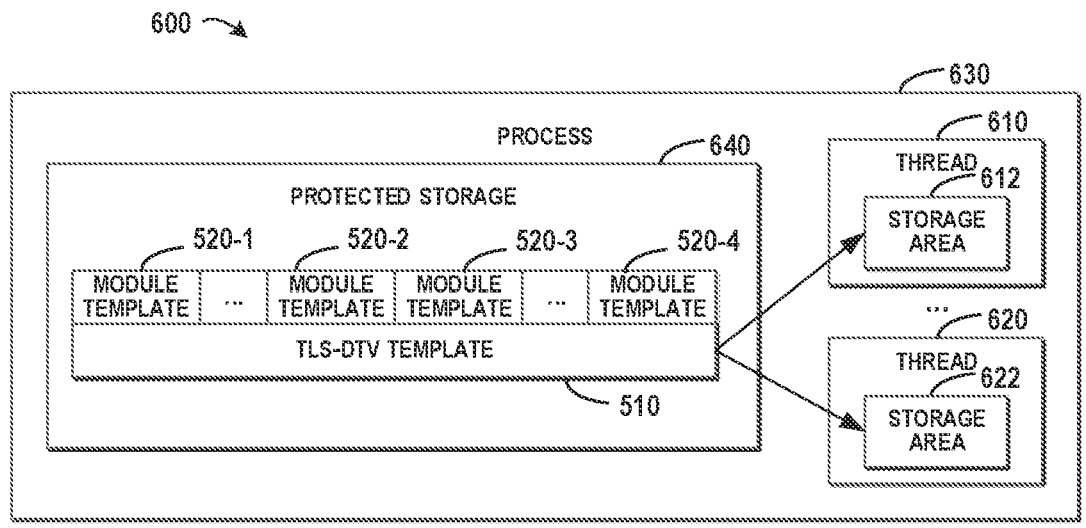
FIG. 6 depicts an example diagram for thread management based on a storage area template according to embodiments of the present invention.

In the computing system, a plurality of storage areas may be allocated for the plurality of threads based on the storage area template, respectively. Then, the plurality of threads may be managed based on the plurality of storage areas, respectively. Hereinafter, reference will be made to FIG. 6 for more details of the further processing. FIG. 6 depicts an example diagram 600 for thread management based on a storage area template according to embodiments of the present invention. During the running of a process 630, at least one thread may be created by the process 630. The following paragraphs will describe embodiments of the present invention by an example where a total number of m threads will be created by the process 630. In FIG. 6, when the process 630 is started in the computing system, the process 630 may create a thread 610, . . . , and a thread 620. In embodiments of the present invention, all these threads 610, . . . , and 620 may be managed based on the TLS-DTV template 510.

In some embodiments of the present invention, in order to generate the TLS-DTV template, a corresponding module template may be generated for each library that is called by the process 630. Here, each module template may correspond to a library and is linked to a protected storage block in the computing system for storing respective variables defined in the library. As shown in FIG. 6, the TLS-DTV template 510 may be generated in protected storage 640 of the computing system. Here, the protected storage 640 is under special protections in the computing system and data in the protected storage 640 may be read out according to a predefined rule (for example, read freely). However, a specific event handler may be called when the data is changed in the protected storage.

As shown in FIG. 6, each module template may be represented by a pointer and being pointed to a protected storage block in the protected storage 640. The protected storage block for a library may have a corresponding size, and the size may be determined based on a storage requirement for the respective variables defined in the library. Further, the protected storage block may be allocated in the computing system for the library based on the storage requirement. In some embodiments of the present invention, each library may be subjected to the similar processing to determine a protected storage block for the library.

With respect to a specific library, the library may be analyzed for extracting information of respective variables that are defined in the library. Specifically, the number of the respective variables and types of the respective variables may be determined. Supposing k variables are defined in the library and each variable has an "integer" type, the storage requirement (represented as size$_{integer}$) for the "integer" type and the number k may be used for determining the storage requirement for the library: size$_{integer}$*k. With these embodiments, the storage requirement may provide details for determining the size and other configurations of the protected storage block. Therefore, the protected storage block may be customized based on a corresponding storage requirement for the library.

In another example, if more types of variables are defined in the library, the storage requirement for each type may be determined based on the similar way. Further, the storage requirement for all the types may be summed for determining the final storage requirement for the library. With these embodiments, a final storage requirement may be easily calculated according to the number and the types of the respective variables. Accordingly, the storage requirement may be determined in an accurate manner so as to provide accurate supports in allocating the protected storage block for each library.

Once the final storage requirement is determined, the size of the protected storage block may be determined and then a corresponding block of the determined size may be selected from the protected storage 640 as the protected storage block. Next, the module template may be pointed to the protected storage block. Further, all the libraries may be subjected to the similar processing so as to determine the respective module templates 520 in the TLS-DTV template 510. For example, a protected storage block may be allocated for a specific one in the libraries, and the protected storage block may be referred to in a module template in the TLS-DTV template 510. For example, the module template 520-1 may be linked to a protected storage block for storing respective variables defined in the 1$^{st}$ library, . . . , and the module template 520-4 may be linked to a protected storage block for storing respective variables defined in the n$^{th}$ library. At this point, all the module templates 520-1, . . . , 520-2, 520-3, . . . , and 520-4 are determined, and then the TLS-DTV template 510 is generated to comprise all the module templates 520. With these embodiments, the module template 520 may be linked to the protected storage block, which may support the plurality of threads to share the module template. Compared with an existing solution for allocating an individual storage block for each thread, the storage resource cost may be greatly reduced.

In some embodiments of the present invention, a plurality of storage areas may be allocated for the plurality of threads based on the storage area template, respectively. Specifically, once a thread is created in the process, the storage area template may be copied to a storage area that is to be allocated to the thread. Referring to FIG. 6, if the thread 610 is created by the process 630, the TLS-DTV template 510 is copied to a storage area 612 for the thread 610. Similarly, if the thread 620 is created, the TLS-DTV template 510 is copied to a storage area 622 for the thread 620. Although the storage areas 612 and 622 reside at different positions, corresponding module templates in the two storage areas 612 and 622 are linked to the same protected storage block. For example, both of the first module template in the storage area 612 and the first module template in the storage area 622 are linked to the same protected storage block in the protected storage 640. With these embodiments, once the threads are created in the process, each thread may be allocated with a specific storage area for storing its local variables. Therefore, all the threads may be managed in a uniformed way, such that the complicity for thread management may be reduced.

Further, respective initial values in the protected storage block may be configured for the respective variables defined in the library. In some embodiments of the present invention, the process 630 may call various libraries including a static type and a dynamic type. For a static library, initial values for respective variables defined in the static library may be determined at the beginning of the process. In other words, initial values for the respective variables may be obtained when the process is started. For a dynamic library, initial values for respective variables defined in the dynamic library may be determined only when the dynamic library is loaded. At this point, initial values for the respective variables may be obtained in different ways.

Figure 7:
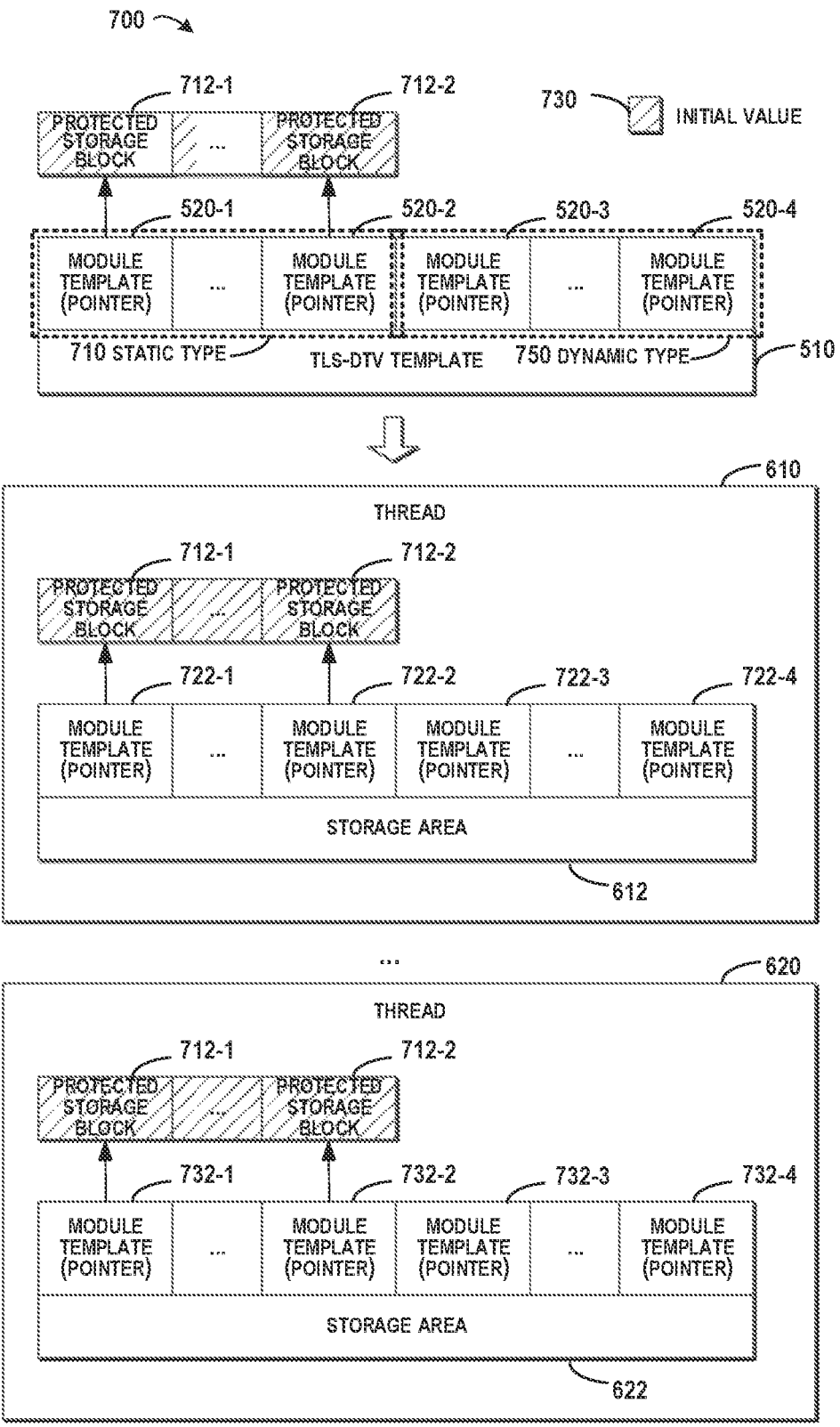
FIG. 7 depicts an example diagram for configuring an initial value for a variable defined in a static library according to embodiments of the present invention.

Hereinafter, reference will be made to FIG. 7 for details about how to deal with the static library. FIG. 7 depicts an example diagram 700 for configuring an initial value for a variable defined in a static library according to embodiments of the present invention. Supposing the process 630 calls a plurality of static libraries (represented as the $1^{st}$ static library, . . . , and the $i^{th}$ static library) and a plurality of dynamic libraries (represented as the $1^{st}$ dynamic library, . . . , and the $j^{th}$ dynamic library), and the TLS-DTV template 510 may comprise corresponding module templates 520 for these static/dynamic libraries. For example, the above static/dynamic libraries may be sorted, and the static libraries may be placed ahead of the dynamic libraries. In FIG. 7, the module templates 520-1, . . . , 520-2 are module templates for the static type 710, while the module templates 520-3, . . . , 520-4 are module templates for the dynamic type 750.

Operations related to the static type 710 will be described first, here the module template 520-1 is linked to a protected storage block 712-1 for the $1^{st}$ static library, . . . , and the module template 520-2 is linked to a protected storage block 712-2 for the $i^{th}$ static library. When the thread 610 is created, the TLS-DTV template 510 may be copied to the storage area 612, and thus the storage area 612 comprises module templates 722-1, . . . , 722-2, 722-3, . . . , 722-4.

Here, the module templates 722-1, . . . , 722-2 relate to the static type 710 and are pointed to the protected storage block 712-1, . . . , 712-2, respectively. The module templates 722-3, . . . , 722-4 relate to the dynamic type 750 and details will be provided later.

In some embodiments of the present invention, in order to configure respective initial values for the respective variables defined in the static library, the respective initial values may be configured when the process 630 is started in the computing system. Here, all the static libraries may be processed one by one when the process 630 is started. With respect to a specific library, initial values for the respective variables may be extracted from codes related to the specific library. Usually, initial values are defined in advance in the codes, if the initial values exist, these initial values may be read out and be used for configuring the respective initial values in the protected storage block. If no initial value exists for a specific variable, a default value (for example, zero or another value) may be configured as the initial value.

Still referring to FIG. 7 for more details about configuring the initial values. The storage area 612 comprise the module templates 722-1, . . . , and 722-2 for the static type 710. Here, the module template 722-1 for the $1^{st}$ static library is pointed to a protected storage block 712-1, and thus the $1^{st}$ static library may be analyzed for extracting the initial values for the respective values defined in the $1^{st}$ static library. Further, the initial values (as shown in FIG. 7, a legend 730 indicates the initial value) may be stored in the protected storage block 712-1. Other libraries may be subjected to the same processing. For example, if the module template 722-2 is for the $i^{th}$ static library, then initial values for respective values defined the $i^{th}$ static library may be extracted and stored in the protected storage block 712-2.

It is to be noted that the above paragraphs only provide an example procedure for configuring the initial values in respective protected storage blocks for the thread 610. In embodiments of the present invention, the thread 620 and other threads may be subjected to the similar processing. As shown in FIG. 7, after the TLS-DTV template 510 is copied to the storage area 622, the storage area 622 may comprise module templates 732-1, . . . , 732-2, 732-3, . . . , and 732-4. Initially, the module templates 732-1, . . . , and 732-2 for the static libraries may be pointed to the protected storage blocks 712-1, . . . , and 712-2 (with the initial values), respectively. With these embodiments, the respective initial values for the respective variables defined in the specific static library are stored in the corresponding protected storage block. Therefore, in the initial phase of these threads, all the threads may share the respective initial values for the specific static library. Compared with an existing solution for allocating individual storage to each thread, the cost in the storage resources may be reduced.

Figure 8:
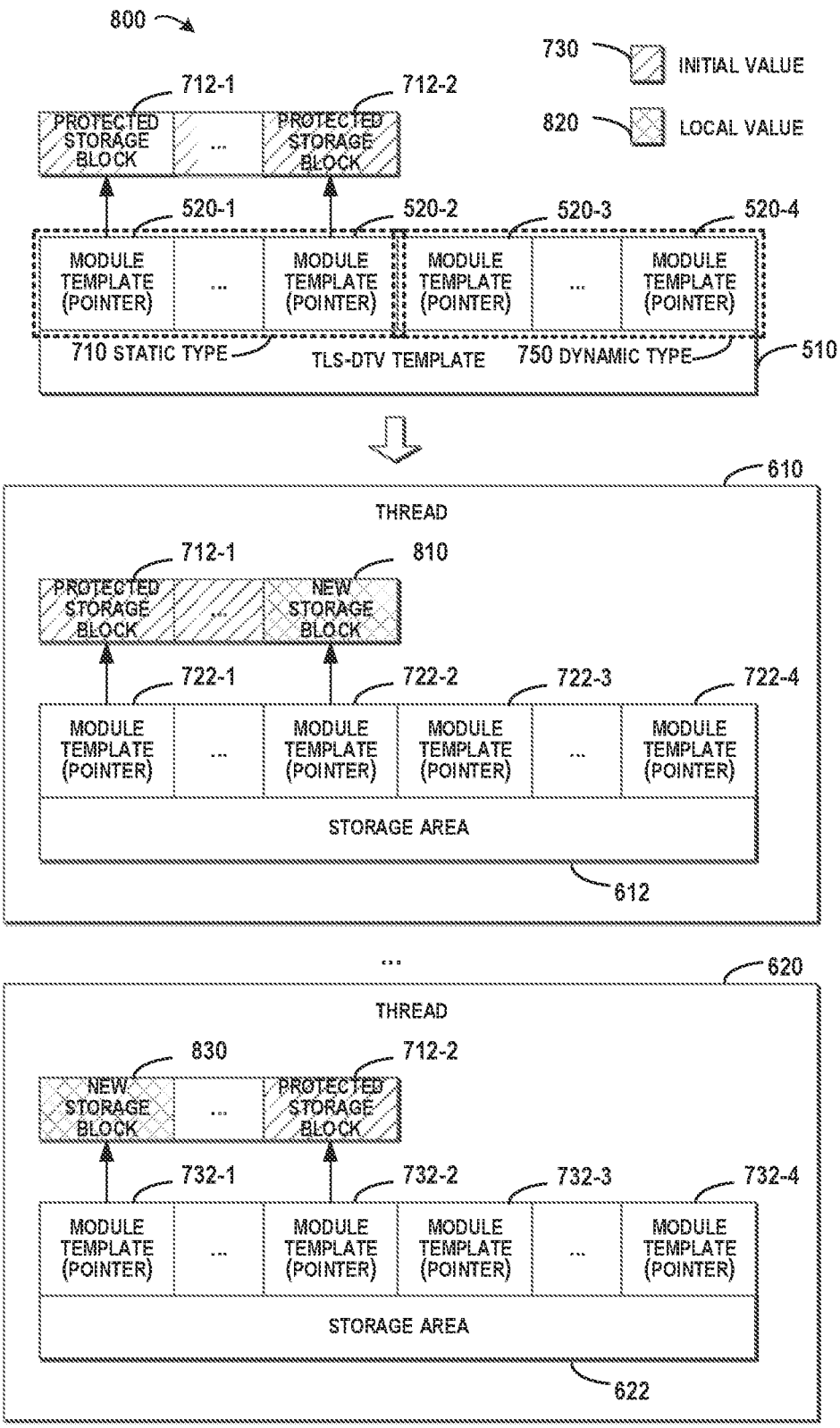
FIG. 8 depicts an example diagram for managing a thread when an initial value for a variable defined in a static library is changed according to embodiments of the present invention.

In some embodiments of the present invention, the plurality of threads may be managed based on the plurality of storage areas. Specifically, with respect to the storage area that is allocated to the thread, the thread may use its's own storage area to facilitate the running of the thread. Here, each protected storage block that is linked to the storage area may be accessed in a similar way during the running of the thread, and the thread may access its protected storage blocks. Reference will be made to FIG. 8 for more details, where FIG. 8 depicts an example diagram 800 for managing a thread when an initial value for a variable defined in a static library is changed according to embodiments of the present invention. Taking the thread 610 as an example, the module templates 722-1, . . . , and 722-2 are pointed to the protected storage blocks 712-1, . . . , and 712-2, respectively.

During the running of the thread 610, the thread 610 may access the protected storage block corresponding to a specific library. With respect to the 1st library, an access request may be triggered to access a target variable in the respective variables. Therefore, it may be detected whether the access request changes the target variable. If it is determined that the access request does not change the initial value for the target variable (which is configured in the protected storage block 712-1), the initial value may be directly accessed by the access request With these embodiments, if the access request does not change the initial value, it indicates that the thread may share the protected storage block with another thread that also does not change its corresponding initial value. Therefore, multiple threads may share the same protected storage block and thus reduce the storage resource cost in the thread management.

In some embodiments of the present invention, if it is determined that the access request changes an initial value (that is configured in the protected storage block) for the target variable, a new storage block may be allocated in the computing system for replacing the protected storage block in the storage area. Supposing the access request changes an initial value for a target variable defined in the $i^{th}$ static library, the module template 722-2 for the $i^{th}$ static library cannot be pointed to the protected storage block 712-2 that is shared with other libraries any more. Instead, a new storage block 810 may be allocated for the $i^{th}$ static library. Specifically, the module template 722-2 in the storage area 612 should be modified to link to the new storage block 810. Further, data in the protected storage block 712-2 may be copied into the new storage block 810, and then a value for the target variable in the new storage block 810 may be modified by the access request. At this point, during the running of the thread 610, the new storage block may store a local value (as shown by a legend 820) for the target variable, and the new storage block may be considered as a private area for storing local values for the $i^{th}$ static library.

With these embodiments, if the access request changes the initial value, it indicates that the initial value should be changed and then the thread cannot share the protected storage block with another thread. At this point, a new storage block is allocated only when the initial value is changed. Usually, the variables are defined for returning codes and thus the initial values are not frequently changed, and then it is not necessary to allocate the new storage block frequently. Therefore, the storage resource cost may be reduced. Further, embodiments of the present invention also prevent another situation for potential wastes in the storage resources. Supposing the thread 610 only calls the $i^{th}$ static library but does not call the other static libraries, besides the storage cost for the storage area 612, additional storage cost for the thread 610 only involve the new storage block 810. Compared with an existing solution for allocating an individual physical storage block for each library (no matter whether the library is called in the thread), the storage resource cost may be greatly reduced.

Although the above paragraphs describe the detailed procedure for managing the thread 610, other threads may be subjected to the similar processing. Still referring to FIG. 8, if an access request in the thread 620 changes an initial value for a target variable in the 1$^{st}$ static library, a new storage block 830 may be allocated to replace the protected storage block 712-1. At this point, the module template 732-1 is linked to the new storage block 830. With these embodiments, when the initial values are changed, the new storage block may provide a local storage space for the respective variable in each thread. Therefore, each thread may have its own storage area for its own variables, and these variables may have their local values in each thread.

Figure 9:
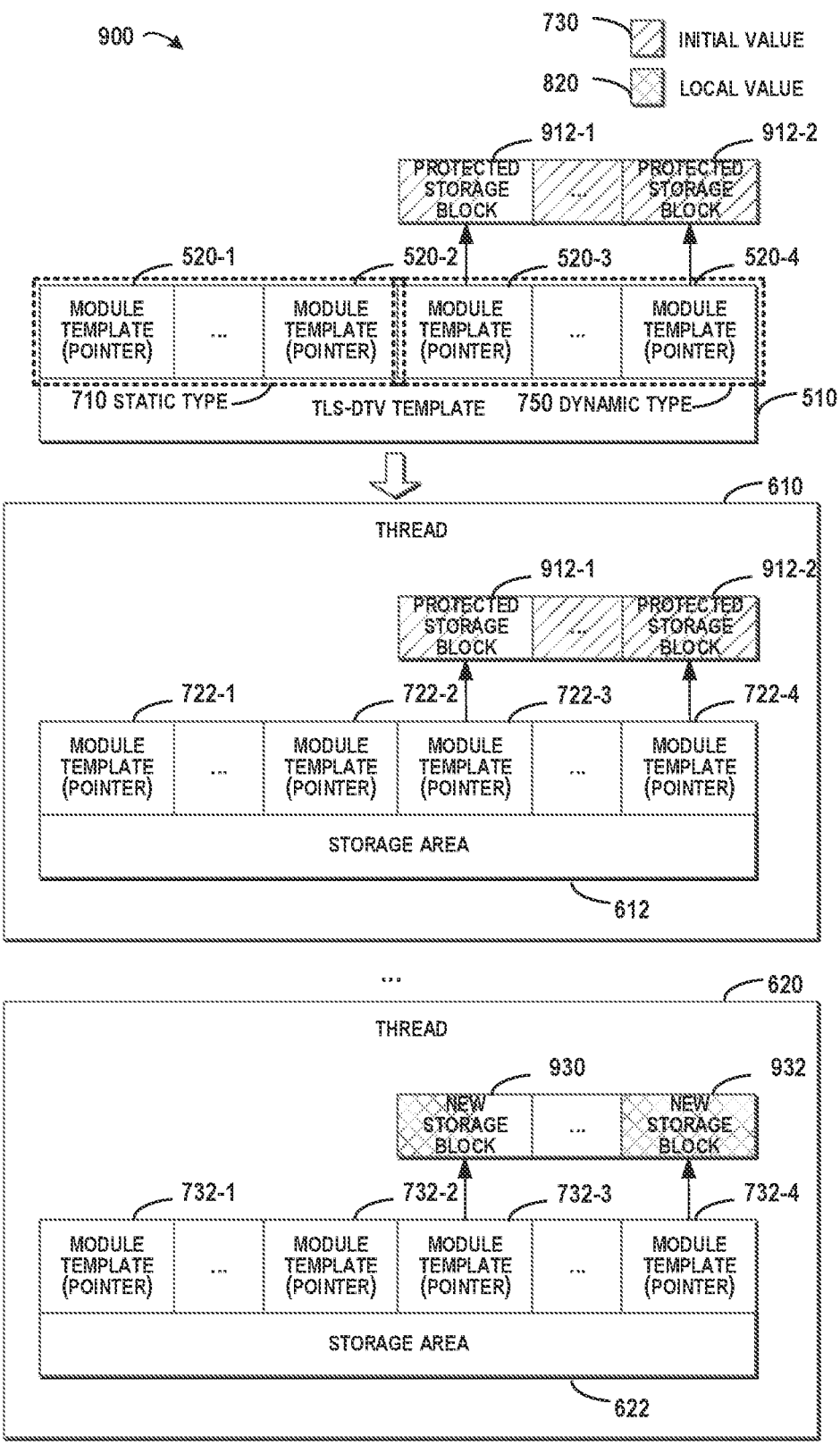
FIG. 9 depicts an example diagram for managing threads associated with dynamic libraries according to embodiments of the present invention.

Having described the static library, the following paragraphs will provide more details about the dynamic library. In some embodiments of the present invention, if the library is classified as the dynamic type, the respective initial values may be configured for the respective variables when the library is loaded by the process. As the dynamic library is loaded into computing system in a dynamic way, the initial values are unknown until the dynamic library is loaded. Reference will be made to FIG. 9 for more details of the dynamic library, where FIG. 9 depicts an example diagram 900 for managing threads associated with dynamic libraries according to embodiments of the present invention. In FIG. 9, the module templates 520-3, . . . , and 520-4 for the dynamic type 750 are pointed to protected storage blocks 912-1, . . . , and 912-2, respectively. After the thread 610 is created, the TLS-DTV template 510 may be copied to the storage area 612, where the module template 722-3, . . . , and 722-4 are initially pointed to the protected storage blocks 912-1, . . . , and 912-2. At this point, as the corresponding dynamic libraries are not loaded, initial values in these protected storage blocks 912-1, . . . , and 912-2 are not configured.

During the running of the thread 610, when a specific dynamic library is loaded, codes related to the specific dynamic library may be analyzed for extracting initial values for respective variables that are defined in the specific dynamic library. Referring to FIG. 9, if the 1$^{st}$ dynamic library is loaded, then initial values for variables that are defined in the 1$^{st}$ dynamic library may be extracted and stored in the protected storage block 912-1. Similarly, when another dynamic library is loaded in the thread 610, initial values may be configured in a corresponding protected storage block. For example, initial values may be configured in the protected storage block 912-2 when the $j^{th}$ dynamic library corresponding to the module template 722-4 is loaded. With these embodiments, the thread management may provide a different branch for processing the dynamic libraries. Therefore, both of the static libraries and the dynamic libraries called by the thread may be managed in a corresponding way.

Similar as the static libraries, when an access request for accessing a protected storage block changes an initial value for a target variable, a new storage block may be allocated to replace the original protected storage block. Supposing the initial values are not changed in the thread 610, the module template 722-3, . . . , and 722-4 still refer to the protected storage block 912-1, . . . , and 912-2, respectively. Supposing the initial values are changed in the thread 620, the storage area 622 for the thread 620 shows a different situation. Referring to the thread 620, if an access request in the thread 620 changes an initial value for a target variable defined in the 1$^{st}$ dynamic library, a new storage block 930 may be allocated and then the module template 732-3 may be pointed to new storage block 930. Further, data in the original protected storage block 912-1 may be copied to the new storage block 930, and the initial value for the target variable in the new storage block 930 may be changed by the access request. At this point, the new storage block 930 may work as a local block for storing local values for the 1$^{st}$ dynamic library. Similarly, if an access request in the thread 620 changes an initial value for a target variable defined in the $j^{th}$ dynamic library, a new storage block 932 may be allocated and then the module template 732-4 may be linked to new storage block 932.

With these embodiments, when the dynamic library is loaded, as the module template for the dynamic library is already linked to the protected storage block for the dynamic library, data in the protected storage block may be directly accessed. Compared with an existing solution for allocating a physical storage block when the dynamic library is actually loaded, allocating the protected storage block in advance may greatly reduce the time delay for loading the dynamic library.

Figure 10:
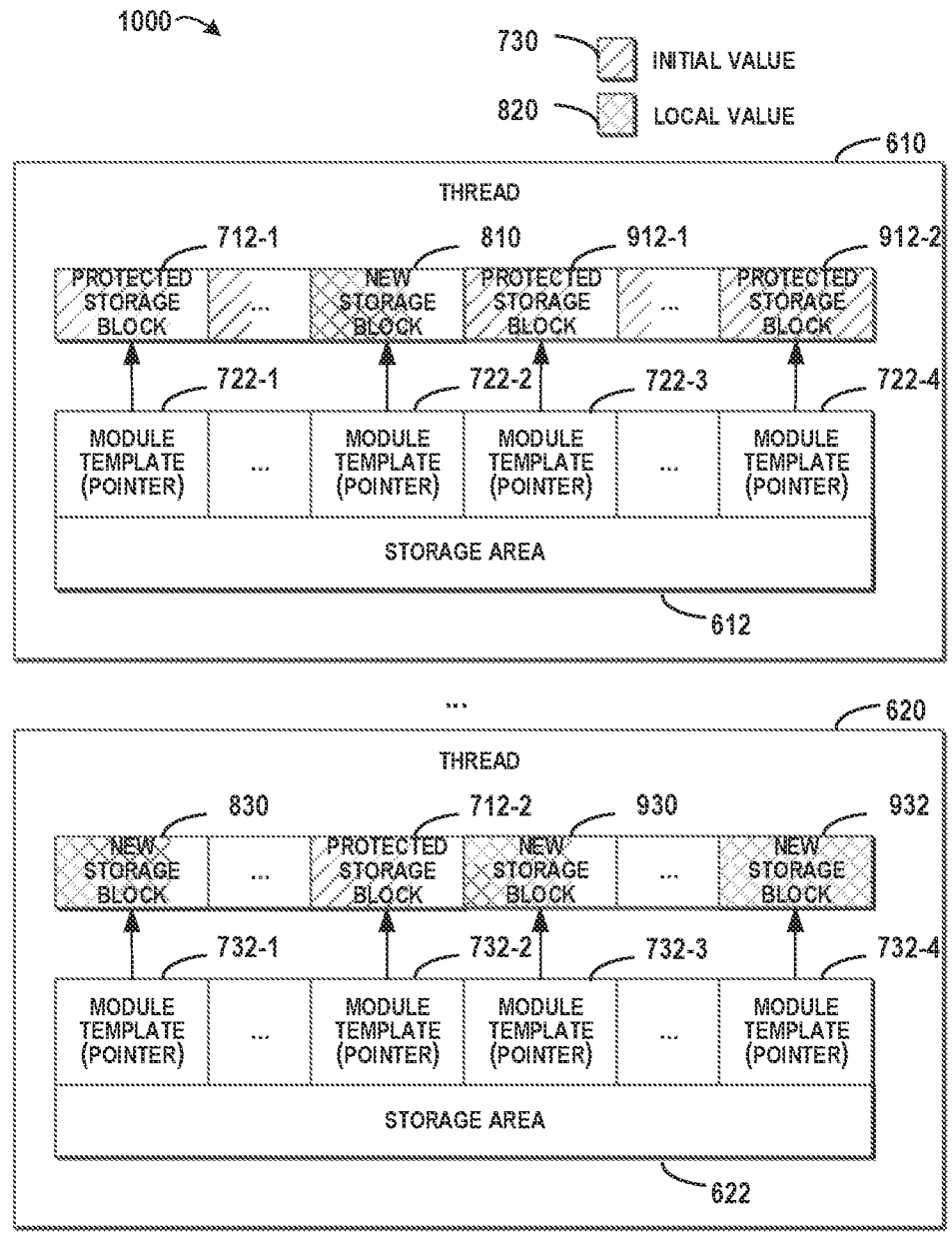
FIG. 10 depicts an example diagram for managing threads associated with both of static and dynamic libraries according to embodiments of the present invention.

The above paragraphs have described details about the static and dynamic libraries in separated examples. FIG. 10 depicts an example diagram 1000 for managing threads associated with both of static and dynamic libraries according to embodiments of the present invention. In FIG. 10, the storage area 612 for the thread 610 comprise multiple module templates 722, where the module template 722-2 is linked to the new storage block 810, and other module templates are linked to the original protected storage blocks, respectively. For the thread 620, the storage area 622 comprise multiple module templates 722, where the module template 712-2 is linked to the original protected storage blocks, while other module templates are linked to the new storage blocks, respectively. As show in FIG. 10, only blocks displayed with the legend 820 for local value occupy additional storage space in the computing system. Based on the above storage area template, embodiments of the present invention may manage various threads that are created by the process in the uniform way. Therefore, the complexity of the thread management and potential costs in the storage resources and time resources may be reduced.

Figure 11:
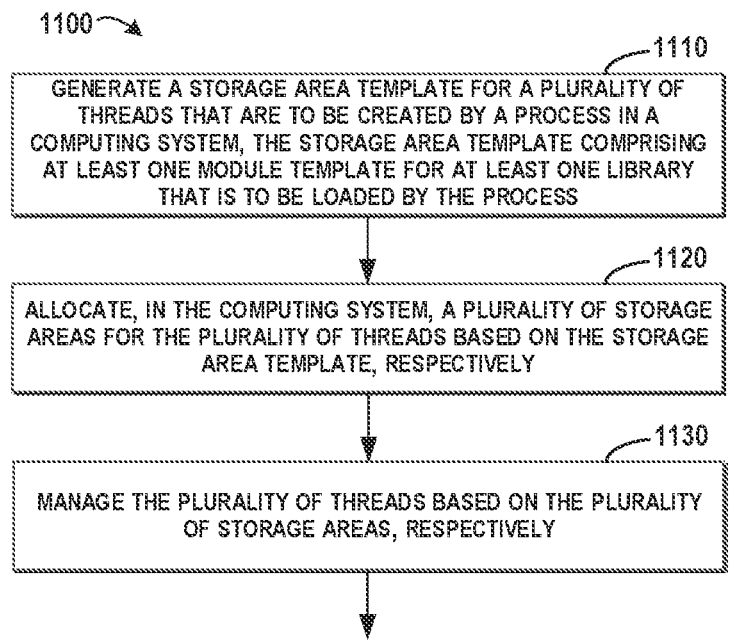
FIG. 11 depicts an example flowchart of a method for thread management based on a storage area template according to embodiments of the present invention.

Hereinafter, reference will be made to FIG. 11 for more details about embodiments of the present invention. FIG. 11 depicts an example flowchart of a method 1100 for thread management based on a storage area template according to embodiments of the present invention. Here, the method 1100 may be implemented by one or more processers. In FIG. 11, at a block 1110, one or more processers generate a storage area template for a plurality of threads that are to be created by a process in a computing system, the storage area template comprising at least one module template for at least one library that is to be loaded by the process. At a block 1120, one or more processors allocate, in the computing system, a plurality of storage areas for the plurality of threads based on the storage area template, respectively. At a block 1130, one or more processors manage the plurality of threads based on the plurality of storage areas.

In some embodiments of the present invention, in order to generate the storage area template, one or more processors generate the at least one module template based on the number of the at least one library, a module template in the at least one module template corresponding to a library in the at least one library and being linked to a protected storage block in the computing system for storing respective variables defined in the library. One or more processors generate the storage area template based on the at least one module template.

In some embodiments of the present invention, in order to generate the at least one module template, with respect to the library in the at least one library, one or more processors obtain a storage requirement for the respective variables defined in the library. Further, one or more processors allocate the protected storage block in the computing system for the module template based on the storage requirement.

In some embodiments of the present invention, in order to obtain the storage requirement, one or more processors determine the storage requirement based on the number of the respective variables and types of the respective variables.

In some embodiments of the present invention, in response to a detection that a thread in the plurality of threads is created by the process, one or more processors copy the storage area template to a storage area in the plurality of storage areas to be allocated to the thread, and then allocate the storage area to the thread.

In some embodiments of the present invention, one or more processors configure respective initial values in the protected storage block for the respective variables defined in the library. Specifically, one or more processors configure the respective initial values for the respective variables when the process is started in the computing system in response to the library being classified as a static type. Alternatively, one or more processors configure the respective initial values for the respective variables when the library is loaded by the process in response to the library being classified as a dynamic type.

In some embodiments of the present invention, with respect to the storage area that is allocated to the thread, one or more processors manage the thread by accessing the protected storage block for the module template corresponding to the library in response to an access request to a target variable in the respective variables being received in the thread.

In some embodiments of the present invention, in response to a determination that the write request does not change an initial value that is configured in the protected storage block for the target variable, one or more processors access the initial value based on the access request.

In some embodiments of the present invention, in response to a determination that the access request changes an initial value that is configured in the protected storage block for the target variable, one or more processors allocate a new storage block in the computing system for replacing the protected storage block in the storage area, and then modify the storage area to link to the new storage block. Further, one or more processors copy data in the protected storage block into the new storage block; and modify a value for the target variable in the new storage block based on the access request.

In another aspect of the present invention, there is provided a computer-implemented system. The computer-implemented system comprises a computer processor coupled to a computer-readable memory unit, where the memory unit comprises instructions that when executed by the computer processor implements the above method 1000.

In another aspect of the present invention, there is provided a computer program product. The computer program product comprises a computer readable storage medium having program instructions embodied therewith. The program instructions are executable by an electronic device to cause the electronic device to perform actions of the above method 1000.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In some embodiments of the present invention, in order to generate the storage area template, one or more processors generate the at least one module template based on the number of the at least one library, a module template in the at least one module template corresponding to a library in the at least one library and being linked to a protected storage block in the computing system for storing respective variables defined in the library. One or more processors generate the storage area template based on the at least one module template. With these embodiments, the module template may be generated based on the protected storage block, which may support the plurality of threads to share the module template. Compared with an existing solution for allocating an individual storage block for each thread, the storage resource cost may be greatly reduced.

In some embodiments of the present invention, in order to generate the at least one module template, with respect to the library in the at least one library, one or more processors obtain a storage requirement for the respective variables defined in the library. Further, one or more processors allocate the protected storage block in the computing system for the module template based on the storage requirement. With these embodiments, the storage requirement may provide details for determining a size and other configurations of the protected storage block. Therefore, the protected storage block may be customized based on a corresponding storage requirement for the library.

In some embodiments of the present invention, in order to obtain the storage requirement, one or more processors determine the storage requirement based on the number of the respective variables and types of the respective variables. With these embodiments, a total storage requirement may be easily calculated according to the number and the types of the respective variables. Accordingly, the storage requirement may be determined in an accurate manner so as to provide accurate supports in allocating the protected storage block.

In some embodiments of the present invention, in order to allocate the plurality of storage areas for the plurality of threads based on the storage area template, one or more processors copy the storage area template to a storage area in the plurality of storage areas to be allocated to the thread in response to a detection that a thread in the plurality of threads is created by the process. Further, one or more processors allocate the storage area to the thread. With these embodiments, once the threads are created in the process, each thread may be allocated with a specific storage area for storing its local variables. Therefore, all the threads may be managed in a uniformed way, such that the complicity for thread management may be reduced.

In some embodiments of the present invention, one or more processors configure respective initial values in the storage area for the respective variables defined in the library. Specifically, one or more processors configure the respective initial values for the respective variables when the process is started in the computing system in response to the library being classified as a static type. Alternatively, one or more processors configure the respective initial values for the respective variables when the library is loaded by the process in response to the library being classified as a dynamic type. With these embodiments, the thread management may provide different branches for processing libraries of both of the static and dynamic types. Therefore, both of the static libraries and the dynamic libraries called by the plurality of threads may be managed in a corresponding way.

In some embodiments of the present invention, in order to manage the plurality of threads based on the plurality of storage areas, with respect to the storage area that is allocated to the thread, one or more processors manage the thread by accessing the protected storage block for the module template corresponding to the library in response to an access request to a target variable in the respective variables being received in the thread. With these embodiments, the protected storage block may provide a local storage space for the respective variable in each thread. Therefore, each thread may have its own storage area for its own variables, and these variables may have their local values in each thread.

In some embodiments of the present invention, in order to manage the thread, one or more processors determine whether the access request changes an initial value that is configured in the protected storage block for the target variable. If it is determined that the access request does not change an initial value that is configured in the protected storage block for the target variable, one or more processors access the initial value based on the access request. With these embodiments, if the access request does not change the initial value, it indicates that the thread may share the protected storage block with another thread that also does not change its corresponding initial value. Therefore, multiple threads may share the same protected storage block and thus reduce the storage resource cost in the thread management.

In some embodiments of the present invention, if it is determined that the access request changes an initial value that is configured in the protected storage block for the target variable, one or more processors allocate a new storage block in the computing system for replacing the protected storage block in the storage area. One or more processors modify the storage area to link to the new storage block, copy data in the protected storage block into the new storage block; and then modify a value for the target variable in the new storage block based on the access request. With these embodiments, if the access request changes the initial value, it indicates that the initial value should be changed, and then the thread should has its private storage block and cannot share the protected storage block with another thread. At this point, the new storage block is allocated only when the initial value is changed, and thus the storage resource cost may be reduced.

Some embodiments of the present invention are directed to a computer-implemented method, comprising: generating, by one or more processors, a storage area template for a plurality of threads that are to be created by a process in a computing system, the storage area template comprising at least one module template for at least one library that is to be loaded by the process; allocating, by one or more processors and in the computing system, a plurality of storage areas for the plurality of threads based on the storage area template, respectively; and managing, by one or more processors, the plurality of threads based on the plurality of storage areas, respectively. The generating the storage area template includes: generating, by one or more processors, the at least one module template based on the number of the at least one library, a module template in the at least one module template corresponding to a library in the at least one library and being linked to a protected storage block in the computing system for storing respective variables defined in the library; and generating, by one or more processors, the storage area template based on the at least one module template. The generating the at least one module template includes: with respect to the library in the at least one library, obtaining, by one or more processors, a storage requirement for the respective variables defined in the library; and allocating, by one or more processors, the protected storage block in the computing system for the module template based on the storage requirement. The obtaining the storage requirement includes determining, by one or more processors, the storage requirement based on the number of the respective variables and types of the respective variables. The allocating the plurality of storage areas for the plurality of threads based on the storage area template, respectively, includes: in response to a detection that a thread in the plurality of threads is created by the process, copying, by one or more processors, the storage area template to a storage area in the plurality of storage areas to be allocated to the thread; and allocating, by one or more processors, the storage area to the thread.

Some embodiments of the present invention are directed to a computer-implemented method, comprising: configuring respective initial values in the protected storage block for the respective variables defined in the library by any of: (a) in response to the library being classified as a static type, configuring, by one or more processors, the respective initial values for the respective variables when the process is started in the computing system; and (b) in response to the library being classified as a dynamic type, configuring, by one or more processors, the respective initial values for the respective variables when the library is loaded by the process. The managing the plurality of threads based on the plurality of storage areas comprises: with respect to the storage area that is allocated to the thread, in response to an access request to a target variable in the respective variables being received in the thread, managing, by one or more processors, the thread by accessing the protected storage block for the module template corresponding to the library. The managing the thread by accessing the protected storage block includes: in response to a determination that the write request does not change an initial value that is configured in the protected storage block for the target variable, accessing, by one or more processors, the initial value based on the access request. The managing the thread by accessing the protected storage block includes: in response to a determination that the access request changes an initial value that is configured in the protected storage block for the target variable, allocating, by one or more processors, a new storage block in the computing system for replacing the protected storage block in the storage area; modifying, by one or more processors, the storage area to link to the new storage block; copying, by one or more processors, data in the protected storage block into the new storage block; and modifying, by one or more processors, a value for the target variable in the new storage block based on the access request.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

allocating, in a computing system, a plurality of storage areas for a plurality of threads to be respectively created by a process in a computing system, the allocating based on a storage area template for the plurality of threads, the storage area template including a plurality of module templates for a plurality of libraries, respectively, that are to be loaded by the process, each library defining a respective set of variables and being linked to a respective protected storage block for storing the respective set of variables, wherein all threads and libraries are managed in a uniform way according to the storage area template;

responsive to a first thread of the plurality of threads being created by the process, copying the storage area template to a first storage area in the plurality of storage areas;

allocating the first storage area to the first thread based on the storage area template;

running the first thread using the first storage area;

during the running of the first thread, analyzing a respective library to extract a set of initial values for respective variables in a first set of variables for the first thread;

storing the set of initial values in a respective protected storage block in the first storage area; and in response to a determination that a write request does not change a first initial value that is configured in the respective protected storage block for a target variable, accessing the first initial value based on the access request.

2. The method of claim 1, further comprising:

generating the plurality of module templates based on a set of libraries including the respective library, each module template corresponding to the respective library and being linked to a respective protected storage block in the computing system for storing the respective set of variables defined in the respective library;

wherein:

generating the storage area template is based on the module template.

3. The method of claim 1, further comprising:

obtaining a storage requirement for the first set of variables defined in the respective library; and allocating the respective protected storage block in the computing system for a first module template based on the storage requirement.

4. The method of claim 1, further comprising:

determining a storage requirement for the first set of variables based on a variable count and a set of variable types corresponding to the first set of variables defined in the respective library.

5. The method of claim 1, further comprising:

in response to an access request to a target variable in the first set of variables being received in the first thread, managing the first thread by accessing the respective protected storage block for the first module template corresponding to the respective library.

6. The method of claim 5, further comprising:

in response to a determination that the access request changes an initial value that is configured in the respective protected storage block for a second target variable, performing a method comprising:

allocating a new storage block in the computing system for replacing the respective protected storage block in the first storage area;

modifying the first storage area to link to the new storage block;

copying data in the respective protected storage block into the new storage block; and modifying a value for the second target variable in the new storage block based on the access request.

7. The method of claim 1, further comprising:

in response to the respective library being classified as a static type, configuring respective initial values in the respective protected storage block for the first set of variables defined in the respective library by configuring the respective initial values for the first set of variables when the process is started in the computing system.

8. The method of claim 1, further comprising:

in response to the respective library being classified as a dynamic type, configuring respective initial values in the respective protected storage block for the first set of variables defined in the respective library by configuring the respective initial values for the first set of variables when the respective library is loaded by the process.

9. The method of claim 1, further comprising:
generating the storage area template for the plurality of threads.

10. A computer system comprising:
a computer processor coupled to a computer-readable memory unit, the memory unit including instructions that, when executed by the computer processor, implements a method comprising:
allocating, in a computing system, a plurality of storage areas for a plurality of threads to be respectively created by a process in a computing system, the allocating based on a storage area template for the plurality of threads, the storage area template including a plurality of module templates for a plurality of libraries, respectively, that are to be loaded by the process, each library defining a respective set of variables and being linked to a respective protected storage block for storing the respective set of variables, wherein all threads and libraries are managed in a uniform way according to the storage area template;
responsive to a first thread of the plurality of threads being created by the process, copying the storage area template to a first storage area in the plurality of storage areas;
allocating the first storage area to the first thread based on the storage area template;
running the first thread using the first storage area;
during the running of the first thread, analyzing a respective library to extract a set of initial values for respective variables in a first set of variables for the first thread;
storing the set of initial values in a respective protected storage block in the first storage area; and
in response to a determination that a write request does not change a first initial value that is configured in the respective protected storage block for a target variable, accessing the first initial value based on the access request.

11. The computer system of claim 10, further comprising:
generating the plurality of module templates based on a set of libraries including the respective library, each module template corresponding to the respective library and being linked to a respective protected storage block in the computing system for storing the respective set of variables defined in the respective library;
wherein:
generating the storage area template is based on the module template.

12. The computer system of claim 10, further comprising:
obtaining a storage requirement for the first set of variables defined in the respective library; and
allocating the respective protected storage block in the computing system for a first module template based on the storage requirement.

13. The computer system of claim 10, further comprising:
determining a storage requirement for the first set of variables based on a variable count and a set of variable types corresponding to the first set of variables defined in the respective library.

14. The computer system of claim 10, further comprising:
in response to an access request to a target variable in the first set of variables being received in the first thread, managing the first thread by accessing the respective protected storage block for the first module template corresponding to the respective library.

15. The computer system of claim 14, further comprising:
in response to a determination that the access request changes an initial value that is configured in the respective protected storage block for the target variable, performing a method comprising:
allocating a new storage block in the computing system for replacing the protected storage block in the first storage area;
modifying the first storage area to link to the new storage block;
copying data in the respective protected storage block into the new storage block; and
modifying a value for the target variable in the new storage block based on the access request.

16. A computer program product comprising a computer readable storage medium having program instructions embodied therewith, the program instructions executable by an electronic device to cause the electronic device to perform a method comprising:
allocating, in a computing system, a plurality of storage areas for a plurality of threads to be respectively created by a process in a computing system, the allocating based on a storage area template for the plurality of threads, the storage area template including a plurality of module templates for a plurality of libraries, respectively, that are to be loaded by the process, each library defining a respective set of variables and being linked to a respective protected storage block for storing the respective set of variables, wherein all threads and libraries are managed in a uniform way according to the storage area template;
responsive to a first thread of the plurality of threads being created by the process, copying the storage area template to a first storage area in the plurality of storage areas;
allocating the first storage area to the first thread based on the storage area template;
running the first thread using the first storage area;
during the running of the first thread, analyzing a respective library to extract a set of initial values for respective variables in a first set of variables for the first thread;
storing the set of initial values in a respective protected storage block in the first storage area; and
in response to a determination that a write request does not change a first initial value that is configured in the respective protected storage block for a target variable, accessing the first initial value based on the access request.

17. The computer program product of claim 16, further comprising:
obtaining a storage requirement for the first set of variables defined in the respective library; and
allocating the respective protected storage block in the computing system for a first module template based on the storage requirement.

* * * * *